June 21, 1949.     G. E. BULLOCK     2,473,701
LUBRICANT FILTERING SYSTEM
Filed Dec. 15, 1944

INVENTOR.
GILES E. BULLOCK
BY
Attorney

Patented June 21, 1949

2,473,701

UNITED STATES PATENT OFFICE 2,473,701

LUBRICANT FILTERING SYSTEM

Giles E. Bullock, Rochester, N. Y.

Application December 15, 1944, Serial No. 568,332

2 Claims. (Cl. 184—6)

This invention relates to oil filters for lubricating systems of internal combustion engines and the invention has for its principal object the embodiment of a centrifugal type of oil filter in the lubricating system which constantly supplies the bearings of the engine with lubricating oil to thus continually filter the oil and collect the impurities thereof during the operation of the engine.

Figure 1:
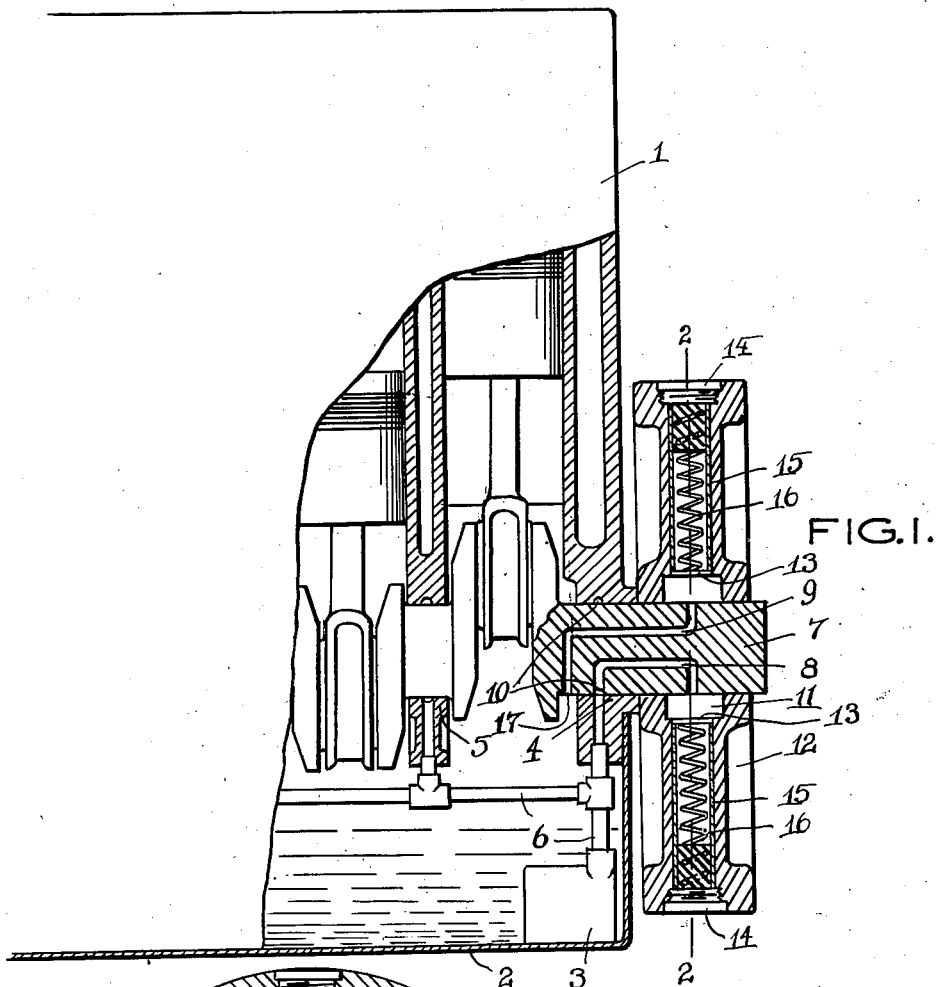

This and other objects and attendant advantages of the invention will become more readily apparent from the detailed description thereof which follows, reference being had to the accompanying drawing in which Figure 1 is a partial sectional view of an internal combustion engine which embodies my invention.

Figure 2:
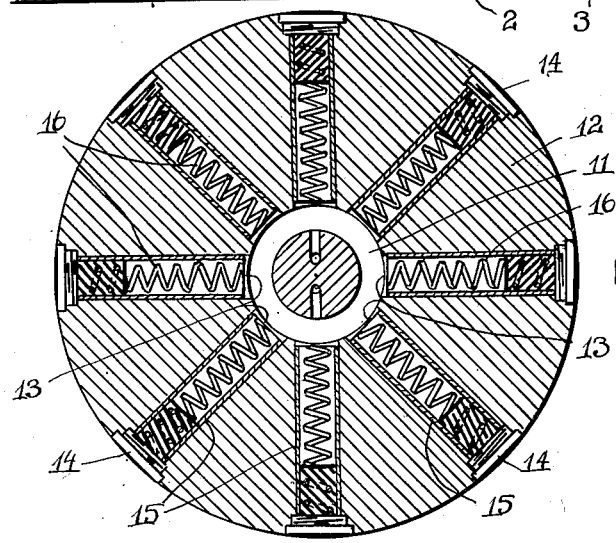

Figure 2 is a sectional view of the centrifugal type of filter which in this case is embodied in the flywheel of the engine.

The invention may be embodied in any one of the various types of internal combustion engines in which a pump or circulator is used to recirculate the lubricating oil which collects in the crank case after it has passed thru the bearings to which it was forced by the pump or circulator.

In the drawing reference numeral I indicates the engine with its crank case 2 at the bottom thereof. In the crank case or in some suitable location with reference thereto is provided the oil pump or circulator 3 in order to have the lubricating oil which collects in the crank case enter the pump for distribution to the various bearings that are connected to the lubricating system. The crank shaft bearings are included in the bearings that are lubricated in this manner and two of them, 4 and 5, are shown connected to the pump or circulator 3 by the oil feed line 6. The portion of the crank shaft 7, which is journaled in the bearing 4 and projects from the crank case, is provided with the inlet duct 8 and the outlet duct 9. The inlet duct is connected with a suitable groove 10 in the bearing so that oil from the bearing will enter and pass thru the duct 8 into the manifold chamber 11 of the centrifugal filter 12. This filter may be incorporated in the flywheel of the engine and comprises the manifold chamber 11 from which radiate the collecting ducts 13, 13 that are uniformly arranged in the wheel. The outer ends of the collecting ducts are normally closed by the removable plugs 14. In the ducts are adapted to be mounted suitable tubular containers 15 in the form of tubes which extend from the removable plugs to the manifold chamber for the reception of the impurities in the oil. An anchoring spring 16 is located in each of the collecting tubes and suitably fastened thereto or to the plug 14 so that the oil sludge formed by the impurities of the oil and collected in the tubes is held in place therein while the tube is removed from the duct for cleaning or replacement by another tube.

The outlet duct 9 in the crank shaft leads from the manifold chamber 11 to provide for the return of the oil filtered by the centrifugal filter into the crank casing. For this purpose the duct 9 has its outlet 17 on the inside of the bearing 4 so as to direct the oil issuing from it into the crank case for redistribution by the pump or circulator 3.

The operation of the filter is as follows: Much of the oil supplied to the bearing 4 continues to be forced thru the duct 8 in the crank shaft into the manifold chamber 11 where the centrifugal force of the filter housing separates the impurities contained in the lubricating oil and forces it into the collecting tubes for deposit therein. The collecting tubes thus gradually fill up with sludge formed by the impurities in the oil and when these collecting tubes are full with sludge, they are removed from the filter by removing the caps to permit the withdrawal of the filled tubes. The anchoring spring causes the sludge to be firmly held in the tubes for the removal with the tubes. The tubes may be cleaned and reinserted into the filter or new tubes may be inserted to receive the sludge from the oil on the continued operation of the engine.

I claim:

1. An oil filter for a crank shaft having a pair of substantially parallel ducts with a radially extending inlet leading into one of said ducts and a radially extending outlet leading from the other of said ducts circumferentially spaced therefrom, a combined fly wheel and filter having a hollow hub forming a manifold chamber mounted on said crank shaft so as to have said manifold chamber connect the inlet and the outlet of said ducts, radially disposed collecting ducts extending from said manifold chamber thru said fly wheel and a removable closure member for closing each of said collecting ducts.

2. The combination as set forth in claim 1 including anchoring means associated with each of said closure members for anchoring semi-solid matter centrifugally forced into said collecting ducts on the rotation of said fly wheel to provide for the removal of the semi-solid matter from said radially disposed ducts on the removal of said closure members.

GILES E. BULLOCK.

REFERENCES CITED

The following references are of record in the file of this patent:

UNITED STATES PATENTS

| Number | Name | Date |
|---|---|---|
| 1,618,870 | Fedden | Feb. 22, 1927 |
| 1,678,272 | Rushmore | July 24, 1928 |
| 1,862,724 | Summers | June 14, 1932 |
| 1,868,814 | Brush | July 26, 1932 |
| 2,028,826 | Copony | Jan. 28, 1936 |

FOREIGN PATENTS

| Number | Country | Date |
|---|---|---|
| 607,994 | France | Apr. 10, 1926 |
| 630,986 | France | Sept. 3, 1927 |